United States Patent [19]
Schöning

[11] Patent Number: 5,360,102
[45] Date of Patent: Nov. 1, 1994

[54] BELT CONVEYOR WITH ROTARY GUIDES FOR MARGINAL PORTIONS OF THE BELT

[75] Inventor: Uwe Schöning, Hildesheim, Germany

[73] Assignee: Transnorm System GmbH, Harsum, Germany

[21] Appl. No.: 228,183

[22] Filed: Apr. 15, 1994

Related U.S. Application Data

[63] Continuation of Ser. No. 2,826, Jan. 8, 1993, abandoned.

[30] Foreign Application Priority Data

Jan. 11, 1992 [DE] Germany .................. 4200539

[51] Int. Cl.⁵ .................................. B65G 15/62
[52] U.S. Cl. .................................. 198/831; 198/840; 198/841; 198/842; 198/836.1
[58] Field of Search ............... 198/831, 839, 840, 842, 198/841, 836.1, 836.6, 836.4, 861.2

[56] References Cited

U.S. PATENT DOCUMENTS

| | | | |
|---|---|---|---|
| 2,733,806 | 2/1956 | Lanier, Jr. ................ | 198/839 X |
| 3,107,004 | 10/1963 | Arndt .................... | 198/861.2 X |
| 3,237,754 | 3/1966 | Freitag, Jr. et al. ........ | 198/831 |
| 3,307,493 | 3/1976 | Keller et al. ............. | 198/861.2 X |
| 3,901,379 | 8/1975 | Bruhm .................... | 198/831 |
| 4,024,949 | 5/1977 | Kleysteuber et al. ....... | 198/831 |
| 4,227,610 | 10/1980 | Gerdes et al. ............ | 198/831 |
| 4,917,232 | 4/1990 | Densmore ................. | 198/831 X |
| 4,955,466 | 9/1990 | Almes et al. ............. | 198/840 X |

FOREIGN PATENT DOCUMENTS

| | | | |
|---|---|---|---|
| 3826953 | 3/1990 | Germany ................. | 198/831 |
| 40-3264412A | 11/1991 | Japan ................... | 198/831 |

*Primary Examiner*—D. Glenn Dayoan
*Attorney, Agent, or Firm*—Darby & Darby

[57] ABSTRACT

Apparatus for transporting discrete objects or bulk goods from a first station at a first level to a second station at a second level, which may but need not be above or below the first level, has an endless belt conveyor which is trained about pulleys at the two stations and has an upper reach which is braced from below by a table and defines a straight horizontal or a hilly path for the commodities. The marginal portions of the belt, at least in the region of the upper reach, are guided by pairs of idler rollers whose axes are inclined relative to each other. The rollers are mounted in bearing units which, in turn, are adjustably coupled to elongated bases of a frame.

20 Claims, 4 Drawing Sheets

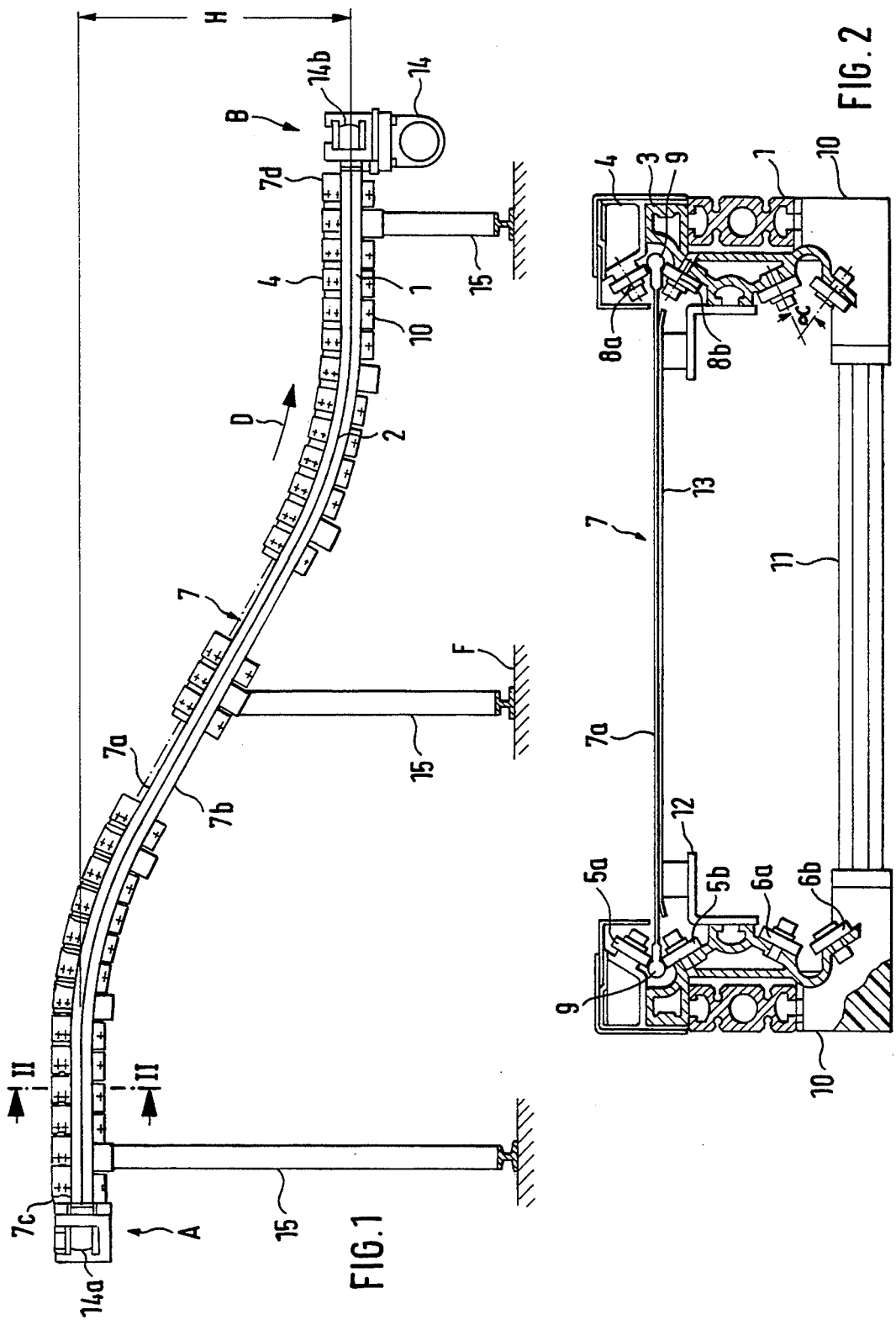

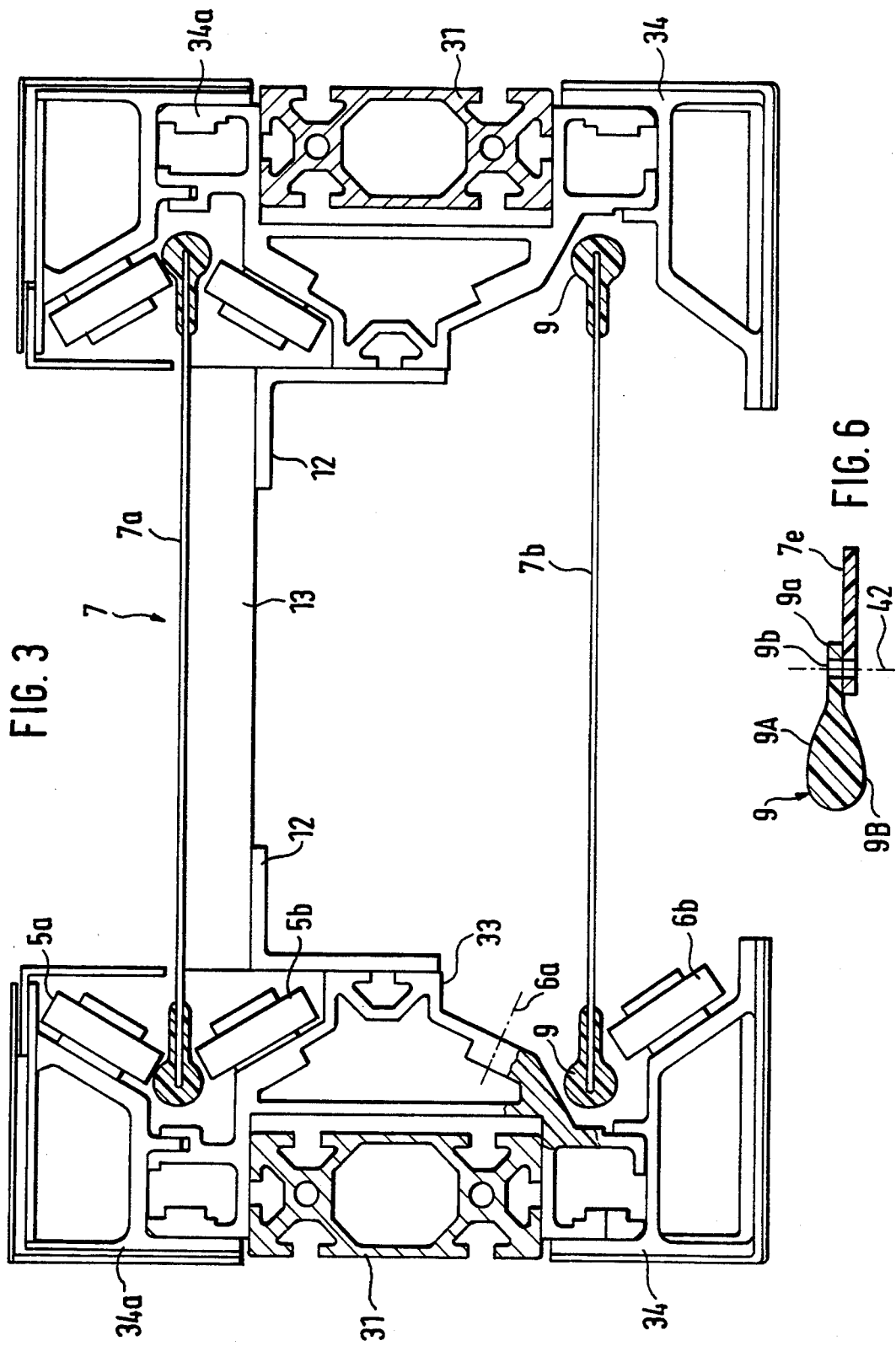

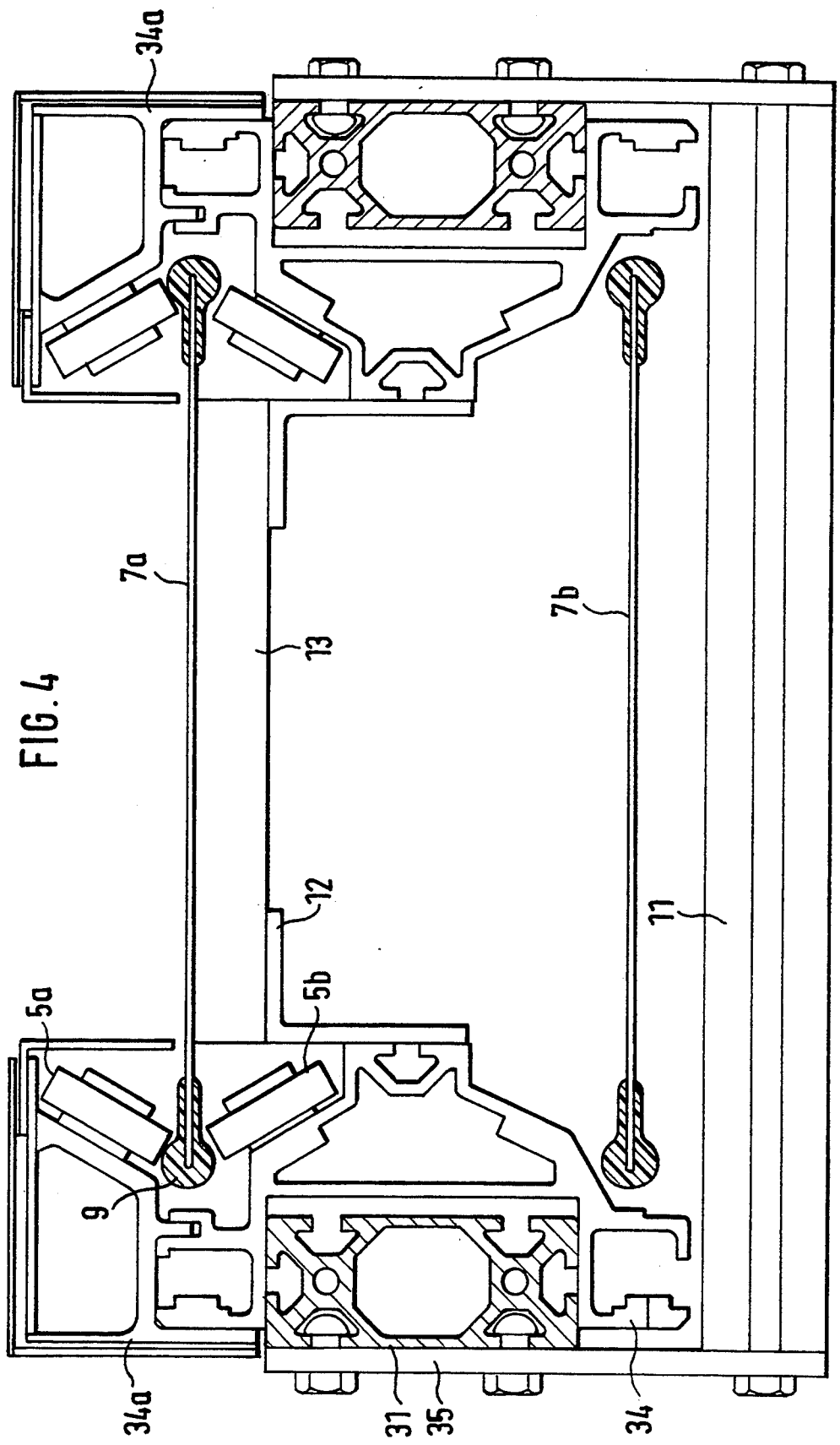

BELT CONVEYOR WITH ROTARY GUIDES FOR MARGINAL PORTIONS OF THE BELT

This is a continuation of application Ser. No. 08/002,826, filed Jan. 8, 1993 now abandoned.

BACKGROUND OF THE INVENTION

The invention relates to transporting apparatus in general, and more particularly to improvements in conveyors which employ endless belts. Still more particularly, the invention relates to belt conveyors which can be utilized with advantage to transport discrete objects or bulk goods along an elongated straight path extending from a first station to a second station, especially a second station which is located at a level above or below the level of the first station.

Heretofore known belt conveyors for the transport of commodities between stations which are disposed at different levels normally employ a plurality of endless belts in series, i.e., each such endless belt defines a portion of the path for the transport of commodities from the first station to the second station. The drives for discrete endless belts must be adjustable so that the movements of neighboring endless belts can be properly synchronized. The transporting stretches or reaches (normally the upper reaches) of neighboring endless belts define transversely extending clearances or recesses which affect the versatility of such conveyors, i.e., certain types of commodities cannot be transported by a conveyor which is assembled of a series of discrete endless belts. Moreover, the recesses or clearances affect the ability of conventional multiple-belt conveyors to transport goods having a particular weight, size and/or shape; for example, such conveyors cannot be used for the transport of goods consisting of discrete particles having a size below a certain range of acceptable sizes or consisting of lightweight particles. Still further, the transfer of conveyed objects or articles from belt to belt normally affects the orientation of transported objects and renders it necessary to guide the objects at both sides of the path and/or to reorient the objects at the second station. Still further, conventional belt conveyors which employ several endless belts must be equipped with complex, bulky and expensive control systems for individual belts; it is often necessary to drive each belt by a separate prime mover and each prime mover must be separately connected to a discrete energy source or to a common energy source for two or more belts. Moreover, the initial, maintenance and repair costs of such conveyors are very high.

For the aforedescribed reasons, presently known belt conveyors employing two or more endless belts which operate in series have failed to gain acceptance in many branches of the industry. As already mentioned above, such conveyors are not suitable for the transport of commodities in the form of small particulate material and/or lightweight material.

OBJECTS OF THE INVENTION

An object of the invention is to provide a transporting apparatus wherein a single endless belt suffices to transport all kinds of commodities between two spaced apart stations which may but need not be disposed at the same level.

Another object of the invention is to provide the above outlined apparatus with novel and improved guides for the marginal portions of the endless belt.

A further object of the invention is to provide an apparatus wherein a single prime mover suffices to drive that part which contacts the commodities on their way from a first station (e.g., a delivery station at a first level) to a second station (e.g., a receiving station at a second level well above or below the first level).

An additional object of the invention is to provide the above outlined apparatus with a novel and improved frame.

Still another object of the invention is to provide a transporting apparatus which can be rapidly converted to transport selected commodities along a shorter or longer path.

A further object of the invention is to provide an apparatus which can be rapidly converted to transport selected commodities between two levels at a greater or lesser vertical distance from one another.

A further object of the invention is to provide a novel and improved endless belt for use in the above outlined apparatus.

Another object of the invention is to provide an apparatus which is particularly suited to transport small and/or lightweight particles as well as heavy and bulky commodities between two spaced apart stations and wherein the orientation of conveyed commodities is less likely to change than in heretofore known apparatus.

An additional object of the invention is to provide a belt conveyor which is more versatile and less complex than heretofore known belt conveyors of the type employing a series of two or more successive endless belts.

Still another object of the invention is to provide a conveyor wherein the bulky parts, such as portions of the housing or frame, can be mass produced in available machines.

A further object of the invention is to provide a novel and improved method of assembling and dismantling the constituents of the above outlined transporting apparatus.

SUMMARY OF THE INVENTION

The invention is embodied in an apparatus for transporting commodities (such as discrete articles or bulk goods) from a first or delivery station at a first level to a second or receiving station at a second level which may but need not always be different from the first level. The improved apparatus comprises an endless belt or band (hereinafter called belt) having an elongated upper stretch or reach defining a straight path which extends from the first station to the second station, a lower stretch or reach, a first end turn at the first station, a second end turn at the second station and first and second marginal portions. The apparatus further comprises means for driving the belt so that the upper reach advances in a direction from the first station toward the second station, and such driving means can comprise a pulley for at least one of the end turns and an electric motor or any other suitable prime mover which transmits torque to the pulley. Still further, the improved apparatus comprises means for guiding the marginal portions of the lower reach and/or the upper reach, and such guiding means includes a series of groups of rollers adjacent each reach. Each group comprises a first roller at one side of the respective marginal portion and a second roller at the other side of the respective marginal portion at least substantially opposite the first roller. The apparatus also comprises a support for the guiding means.

The statement that the upper reach of the belt defines a straight path is intended to express that the marginal portions of the upper reach are or can be disposed in two at least substantially flat parallel vertical planes, i.e., that the path which is defined by the upper reach does not meander sideways. However, and regardless of whether or not one of the two levels is disposed above the other level, the marginal portions of the upper reach can include arcuate sections; such marginal portions preferably have identical configurations.

The rollers of each group are preferably rotatable about axes which are inclined relative to each other. The rollers of each group can be mirror images of one another and their axes can diverge in a direction toward the respective marginal portion. Each marginal portion can constitute or resemble a bead having two flanks, and the flanks of the first and second marginal portions preferably converge toward the second and first marginal portions, respectively. Each roller engages one of these flanks.

The support for the guiding means can comprise a plurality of modules and means for coupling the modules to each other. Such modules can include an elongated base for each of the two marginal portions and first and second bearing units on each base. The first bearing units mount at least some of the first rollers, and the second bearing units mount at least some of the second rollers of the respective groups. The coupling means can comprise means for longitudinally adjustably connecting at least some of the modules, such as the first or the second bearing units, to the respective bases. The connecting means can comprise suitably configurated grooves provided in and extending longitudinally of the bases or bearing units and followers (such as the heads of bolts or screws) which are provided in the bearing units or in the bases and extend into and are movable longitudinally of the grooves to permit movements of the respective modules to desired positions in which the adjustable modules are thereupon affixed (e.g., by screws) to the respective base or bearing unit.

At least one of the modules can have a T-profile and can be made entirely of or can contain steel. Furthermore, at least some of the modules can consist of or at least contain a suitable plastic material. At least some of the modules can constitute extrusions.

The apparatus can further comprise a table or another suitable abutment or rest for the underside of the upper reach of the belt between the two marginal portions of such upper reach.

If desired, the second level can be at least close to the first level, and at least a major part of the path which is defined by the upper reach for advancement of commodities from the first station toward the second station can be at least substantially horizontal.

The median portion of the belt can but need not be of one piece with the marginal portions. For example, the marginal portions can be produced as separate parts and can be secured to a separately produced median portion of the belt. The means for securing the separately produced marginal portions to the median portion of the belt can include apertured (e.g., slotted) extensions provided on the marginal portions and means for affixing such extensions to the median portion of the belt.

The arrangement can be such that the rollers of each group are rotatable about axes disposed in a common plane which is at least substantially normal to the marginal portion between the rollers of the respective group. Thus, the orientation of the groups of rollers relative to each other can vary if the marginal portions of the upper reach of the belt include arcuate sections.

The novel features which are considered as characteristic of the invention are set forth in particular in the appended claims. The improved transporting apparatus itself, however, both as to its construction and the mode of manipulating the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a schematic side elevational view of a transporting apparatus which embodies one form of the invention and wherein the endless conveyor belt serves to advance commodities between two stations which are located at different levels;

FIG. 2 is an enlarged transverse vertical sectional view substantially as seen in the direction of arrows from the line II—II in FIG. 1;

FIG. 3 is a sectional view similar to that of FIG. 2 but showing certain details of a second transporting apparatus;

FIG. 4 is a sectional view similar to that of FIG. 2 but showing certain details of a third transporting apparatus;

FIG. 6 is a fragmentary sectional view of an endless belt which can be used in the transporting apparatus of FIGS. 1-2, FIG. 3, FIG. 4 or FIG. 5.

DESCRIPTION OF PREFERRED EMBODIMENTS

Figure 5:
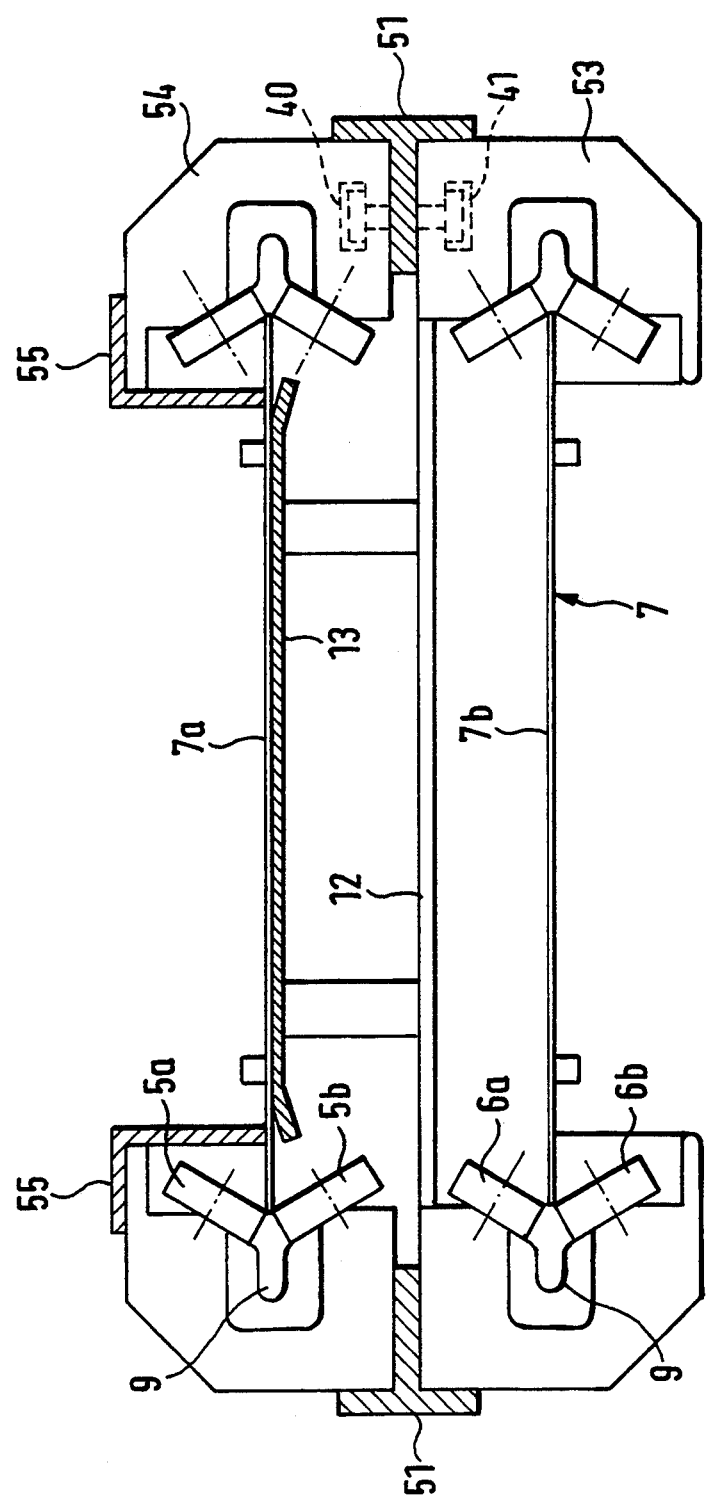
FIG. 5 is a sectional view similar to that of FIG. 2 but showing certain details of a fourth transporting apparatus.

FIGS. 1 and 2 illustrate certain component parts of a transporting apparatus which can be utilized to advance discrete commodities or bulk goods from a first station A at a higher first level to a second station B at a lower second level. The difference between the two levels (indicated at H) can be substantial. However, the improved apparatus can be utilized with equal or similar advantage to transport commodities between two stations which are located at or close to the same level or to transport commodities from a first station at a lower first level to a second station at a higher second level.

The transporting apparatus comprises a composite (preferably modular) support including two elongated main carriers or bases 1 which have a configuration corresponding to that (indicated by a curve 2) of an elongated path extending from the first station A to the second station B and defined by the upper side of the upper stretch or reach 7a of a single endless belt conveyor 7. Each carrier or base 1 preferably separably and preferably adjustably supports an elongated bearing unit 10 for the shafts of groups (preferably pairs) of rollers 6a, 6b constituting a means for guiding the marginal portions 9 of the lower reach 7b of the belt 7. The two bearing units 10 are separably connected to each other by transversely extending beams 11. Selected beams or all of the beams 11 are secured to the floor or ground F by pairs of upright columns 15 having different heights depending upon the distance of the respective beams 11 from the floor F. Of course, the posts 15 can be mounted to directly support the bearing units 10. Alternatively, posts 15 for the beams 11 can be used in addition to posts or columns (not shown) which connect selected portions of the bearing units 10 to the ground or floor F.

The support of the transporting apparatus further comprises two composite bearing units each having an upper part 4 and a lower part 3 separably affixed to the respective base 1. The parts 4 support rollers 5a forming part of groups or pairs of rollers which serve as a means for guiding the marginal portions 9 of the upper reach 7a of the belt 7, and the parts 3 support the rollers 5b of such pairs or groups. The bases 1, the bearing units 10, the composite bearing units including the parts 3, 4 and/or the beams 11 preferably constitute modules which are adjustably secured to each other and/or to the respective bases and can be moved along such bases to selected positions to be thereupon fixed in such positions by screws, bolts, rivets or other suitable fasteners. The means for separably coupling neighboring modules to each other can include grooves 40 (e.g., T-grooves) of the type shown in FIG. 5 and followers 41 (such as heads of bolts or screws) which extend into and can move longitudinally of the grooves. FIG. 5 shows that the grooves 40 are provided in the modular bearing units 53, 54 and the followers 41 are secured to the respective modular bases 51 in the form of T-bars; however, it is equally within the purview of the invention to provide the grooves in the bases (such as the bases 1) and to then provide the followers in the adjacent modules, such as the bearing units 10 and the composite bearing units 3, 4 of the frame or support forming part of the transporting apparatus of FIGS. 1 and 2.

The parts 3, 4 of the bearing units which carry the guiding rollers 5a, 5b can be separably coupled to each other in any suitable manner, e.g., in a manner as shown schematically in FIG. 5, as at 40 and 41.

The lower reach 7b of the endless belt 7 is not shown in FIG. 2. The two beaded marginal portions 9 of this lower reach (i.e., the corresponding sections of the two endless marginal portions of the belt 7) are guided by the groups or pairs of rollers 6a, 6b. The groups or pairs of rollers 5a, 5b guide the marginal portions 9 of the upper reach 7a. As can be best seen in FIG. 6, each marginal portion 9 can include two flanks 9A, 9B which are inclined with reference to each other in such a way that the flanks of one marginal portion converge toward the other marginal portion and vice versa. The rollers 5a, 5b respectively engage the flanks 9A, 9B of marginal portions 9 at the upper reach 7a, and the rollers 6b, 6a respectively engage the flanks 9A, 9B of marginal portions 9 of the lower reach 7b. Each roller 5a is or can be a mirror image of the adjacent roller 5b, and the same applies for the groups of rollers 6a, 6b.

The axes 8a, 8b of the rollers 5a, 5b forming part of the groups or pairs for guiding the marginal portions 9 of the upper reach 7a are inclined toward each other in directions away from the marginal portions 9 which are guided by the respective groups of rollers 5a, 5b, and the same applies for the axes of the groups of rollers 6a, 6b for the marginal portions 9 of the lower reach 7b. The shafts for the rollers 6a, 6b are rotatably or nonrotatably mounted in the bearing units 10 (depending upon whether or not the rollers 6a, 6b are rotatable on their shafts), the shafts of the rollers 5a are rotatably or nonrotatably mounted in the parts 4 of the respective composite bearing units 3, 4, and the shafts of the rollers 5b are rotatably or non-rotatably mounted in the parts 3 of the respective composite bearing units. The illustrated rollers 5a, 5b, 6a, 6b are idler rollers. The angles alpha defined by the illustrated pairs of rollers 5a, 5b and 6a, 6b are acute angles. The exact size of each such angle depends on the mutual inclination of flanks 9A, 9B on the corresponding marginal portions 9.

The parts 3 of the composite bearing units 3, 4 carry brackets 12 which, in turn, support a table 13 serving to prop the underside of the upper reach 7a between the respective marginal portions 9. The table can be of one piece if the distance of the stations A and B from each other is relatively short. The illustrated table 13 is continuous all the way between the stations A, B and the configuration of its upper side follows that of the curve 2, i.e., the configuration of the straight path between the two stations. The table 13 assists the groups of rollers 5a, 5b in properly guiding and shaping the upper reach 7a of the belt 7, i.e., the elongated straight path between the stations A and B. This path is straight in a sense that it does not extend laterally beyond two flat vertical planes which include or flank its marginal portions 9; however, and as shown in FIG. 1, the path for the advancement of commodities from the station A toward the station B has portions or increments which are disposed at different levels. The transition between different levels is gradual.

In order to properly guide the marginal portions 9 of an upper reach 7a which includes arcuate sections (e.g., arcuate sections as shown in FIG. 1), the axes 8a, 8b of the rollers 5a, 5b in each group of such rollers are preferably disposed in planes which are normal to the nearest sections of the respective marginal portions 9 (namely those sections which extend between the rollers 5a, 5b of the respective group). Thus, if the path which is defined by the upper reach 7a includes arcuate portions, at least some of neighboring groups 5a, 5b will have different orientations to ensure that the respective marginal portions are properly guided not only along straight sections of the path (where the orientation of the groups of rollers 5a, 5b is the same) but also along arcuate sections of such path.

The means for driving the endless belt 7 in such a way that the commodities which are supplied at the first station A are transported toward the second station B (arrow D in FIG. 1) includes an electric gear motor 14 or another suitable prime mover (preferably a variable-speed prime mover) which drives a pulley 14b at the station B. A second pulley 14a is shown at the station A. The end turns 7c and 7d of the belt 7 are respectively trained over the pulleys 14a and 14b.

It has been found that the aforediscussed guiding means for the marginal portions 9 of the single endless belt 7, preferably in conjunction with the table 13 (especially if the curvature of the path as denoted by the curve 2 is rather complex), ensure proper guidance of the upper reach 7a so that the path which is defined by this upper reach is devoid of transversely extending gaps or recesses which are characteristic of transporting apparatus employing a series of two or more endless belts so that the commodities must be transferred from belt to belt prior to reaching their destination. The thus guided upper reach 7a can advance all kinds of commodities at an elevated speed, between stations which are located at the same level or at two widely different levels, and without straying of conveyed commodities transversely of their path. Thus, if the conveyor 7 is used to advance commodities whose orientation is to remain unchanged, this is achieved without resorting to any specially designed and/or mounted lateral guides for the commodities themselves, i.e., the orientation of commodities can remain unchanged merely due to the fact that they rest on the upper side of the upper reach 7a.

The preferably modular components of the frame which carries the guiding rollers 5a, 5b and 6a, 6b can constitute extrusions and can be made of a suitable metallic material (e.g., aluminum or steel) or a suitable plastic material. For example, the bases 1 can be made of aluminum or another metallic material, and at least some of the bearing units 3, 4 and 10 can be made of a suitable plastic material.

The transporting apparatus which embodies the structure of FIG. 3 differs from the transporting apparatus of FIGS. 1–2 in that the illustrated bearing units 34a for the groups of rollers 5a, 5b are of one piece and that the configuration of bearing units 34 for the groups of rollers 6a, 6b is different from that of the bearing units 10 shown in FIG. 2. Each unit 34 is connected with the respective unit 34a by an intermediate portion 33 which carries a bracket 12 for the table 13. The metallic bases 31 which are shown in FIG. 3 are or can be identical with the bases 10 in the apparatus of FIGS. 1–2. The bearing units 34, 34a and the intermediate portions 33 can be made (e.g., extruded) from a suitable plastic material. Certain rollers 6a, 6b are omitted in FIG. 3 for the sake of clarity. The endless belt 7 in the apparatus of FIG. 3 is or can be identical with the endless belt 7 forming part of the apparatus which is shown in FIGS. 1 and 2. The portions 33 can be integral with the adjacent bearing units 34, 34a and, as shown, the portions 33 can mount the shafts for the respective rollers 5b and 6a.

The structure which is shown in FIG. 3 is sturdier than the structure which is shown in FIG. 2. Therefore, an apparatus which embodies the structure of FIG. 3 can be utilized with particular advantage for reliable guidance of a relatively heavy endless belt 7. The bases 1 and 31 can constitute extrusions and can be made of aluminum, the same as the parts 3 of composite bearing units 3, 4 and the portions 33. The parts 4 of the composite bearing units 3, 4 and the bearing units 34, 34a can constitute extrusions and can be made of a suitable plastic material.

The transporting apparatus which embodies the structure of FIG. 4 is similar to the apparatus of FIG. 3. The difference is that, whereas the profiled bearing units 34 of FIG. 3 are or can be directly secured to the beams 11 (not shown in FIG. 3), the apparatus of FIG. 4 further comprises plate-like or strip-shaped upright connectors 35 which secure the bases 31 to the respective end portions of the beams 11. The configuration of the lower bearing units 34' in the apparatus of FIG. 4 is different from that of the bearing units 34 in the apparatus of FIG. 3.

FIG. 5 shows a portion of a further transporting apparatus with a frame having two mirror symmetrical bases 51 in the form of T-bars made of steel or another suitable metallic material. The bases 51 support pairs of bearing units 53, 54 for the groups of rollers 6a, 6b and 5a, 5b, respectively. The holder or holders 12 for the table 13 are mounted on or are of one piece with the lower bearing units 53. The upper side of the table 13 engages the underside of the upper reach 7a of the endless belt 7 between two upright lateral guides 55 which can be of one piece with or are affixed to the respective upper bearing members 54. Thus, the conveyed commodities advance in a channel having a bottom wall constituted by the median portion of the upper reach 7a and two sidewalls constituted by the respective lateral guides 55.

An advantage of the transporting apparatus which embodies the structure of FIG. 5 is that its frame takes up a small amount of space but is still capable of adequately supporting a heavy and bulky endless belt 7 which can be used to transport large and bulky discrete commodities or large quantities of smaller commodities including bulk goods.

FIG. 6 shows that the belt can be made of several pieces which are affixed to each other. There is shown one of the two marginal portions 9, and each such marginal portion has an elongated extension 9a provided with a row of apertures (9b) for reception of fasteners (one indicated by a phantom line, as at 42) which secure the extension 9a to the adjacent edge of the major or median portion 7e of the belt. The fasteners 42 can constitute rivets, nuts and bolts, stitches or any other means for reliably affixing the separately produced marginal portions 9 to the respective edges of the major or median portion 7e.

A similar belt, with separately produced marginal portions 9, is used in the apparatus of FIGS. 3 and 4.

The improved transporting apparatus exhibits a number of important advantages. Thus, the apparatus is versatile because it can be used for the transport of all kinds of commodities including lightweight and heavier commodities, large or small or very small commodities, sensitive and less sensitive commodities, brittle and not readily breakable commodities and many others. The advancement of commodities along the straight path which is defined by the upper reach 7a of the single endless belt 7 is predictable because the path is not interrupted even though it can include portions at different levels. The predictability of transport is not affected by the length of the path, and the ends of the path can be disposed at levels located at a considerable vertical distance H from one another. Moreover, the stations A and B can be located at or close to the same level but the intermediate portion or portions of the path can extend to a number of different levels. This may be of importance if certain commodities are to be removed from or introduced into the path at one or more locations between the stations A and B.

The improved transporting apparatus is simple because any lateral guide means (such as the sidewalls 55 shown in FIG. 5) are normally optional. The absence of such lateral guide means does not adversely affect the directional stability of conveyed commodities. On the other hand, the absence of lateral guide means contributes to simplicity and lower cost of the transporting apparatus and renders it possible to rapidly convert the apparatus for the transport of commodities between different levels and/or through different distances.

The apparatus can be used to transport commodities along a single horizontal path, along a path which includes one or more horizontal sections and/or one or more non-horizontal (particularly arcuate) sections, as well as along a single path which is straight and need not have any arcuate portions even through it serves for the advancement of goods between different levels.

A further advantage of the improved apparatus is that its single endless belt 7 can be set in motion and driven at any one of two or more different speeds by a simple, compact and relatively inexpensive drive. Thus, all that is necessary is to employ a single prime mover and to utilize at least one of the pulleys 14a, 14b as a component part of the drive means.

Still another advantage of the improved transporting apparatus is that it can be assembled from a small number of different parts. Thus, the rollers 5a can be identical with the rollers 5b, 6a and 6b, and the frame can be assembled of large numbers of identical modules including those which together constitute the bases and the bearing units for the rollers.

An additional advantage of the improved apparatus is that it can be rapidly converted to define any one of a number of different (shorter, longer, horizontal, inclined and/or arcuate) paths, depending on the nature of the conveyed commodities, the desired rate of transport of commodities, the desired directional stability of commodities in the path and/or certain other parameters. Directional stability is a parameter which is of considerable or utmost importance in connection with the conveying of numerous types of commodities. Pronounced directional stability of commodities which advance along the path defined by the upper reach 7a of the single belt conveyor 7 renders it possible to eliminate the need for complex and expensive monitoring and/or reorienting devices including pneumatic cylinder and piston units, electromagnetically operated pistons and/or other devices which are used in many presently known transporting apparatus operating with two or more endless belts to adjust the positions of shafts for guide rollers or like parts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

We claim:

1. Apparatus for transporting commodities from a first station at a first level to a second station at a second level, the first level being different than the second level, comprising an endless belt having an upper reach defining a straight path extending from said first station to said second station, a lower reach along the straight path, a first turn at said first station, a second turn at said second station and first and second marginal portions; substantially unitary means for supporting said first reach; means the driving said belt so that said upper reach advances in a direction from said first station toward said second station, including a pulley for at least one of said turns; means for guiding the marginal portions of said upper reach, including a series of groups of rollers adjacent each marginal portion at said upper reach and each of said groups comprising a first roller which engages one side of the respective marginal portion and a second roller which engages the other side of the respective marginal portion at least substantially opposite the first roller; substantially upright lateral guides for confining said commodities to said belt during transport from said first station to said second station; and a support for said guiding means.

2. The apparatus of claim 1, wherein the marginal portions at said upper reach are disposed in two at least substantially flat parallel vertical planes.

3. The apparatus of claim 1, wherein one of said levels is disposed above the other of said levels.

4. The apparatus of claim 1, wherein the marginal portions at said upper reach have identical configurations and each such marginal portion includes at least one arcuate section.

5. The apparatus of claim 1, wherein the rollers of each group are rotatable about axes which are inclined relative to each other.

6. The apparatus of claim 5, wherein the rollers of each of said groups are mirror images of one another.

7. The apparatus of claim 5, wherein said axes diverge in a direction toward the respective marginal portion.

8. The apparatus of claim 5, wherein each of said marginal portions has two flanks, the flanks of said first and second marginal portions respectively converging toward said second and first marginal portions and each of said rollers engaging one of said flanks.

9. The apparatus of claim 1, wherein said support comprises a plurality of modules and means for coupling said modules to each other.

10. The apparatus of claim 9, wherein said modules include a base at each of said marginal portions and first and second bearing units on each of said bases, said first bearing units mounting the first rollers and said second bearing units mounting the second rollers of the respective groups.

11. The apparatus of claim 9, wherein said bases are elongated and said coupling means comprises means for longitudinally adjustably connecting at least some of said bearing units to the respective bases.

12. The apparatus of claim 9, wherein at least some of said modules are extrusions.

13. The apparatus of claim 9, wherein at least one of said modules has a T-profile and contains steel.

14. The apparatus of claim 9, wherein at least some of said modules contain a plastic material.

15. The apparatus of claim 1, wherein said upper reach has an underside and further comprising a table adjacent said underside between said marginal portions.

16. The apparatus of claim 1, wherein said second level is at least close to said first level.

17. The apparatus of claim 1, wherein at least a major part of said path is at least substantially horizontal.

18. The apparatus of claim 1, wherein said belt further comprises a median portion between said marginal portions and means for securing said marginal portions to said median portion.

19. The apparatus of claim 18, wherein said securing means comprises apertured extensions provided on said marginal portions.

20. The apparatus of claim 1, wherein the rollers of each group are rotatable about axes disposed in a common plane at least substantially normal to the marginal portion between the rollers of the respective group.

* * * * *